United States Patent [19]

Selman et al.

[11] 4,276,192

[45] Jun. 30, 1981

[54] POLYMERIZATION CATALYSTS

[75] Inventors: Charles M. Selman; Lawrence M. Fodor, both of Bartlesville, Okla.

[73] Assignee: Phillips Petroleum Company, Bartlesville, Okla.

[21] Appl. No.: 55,426

[22] Filed: Jul. 6, 1979

[51] Int. Cl.$^3$ .............................................. C08F 4/64
[52] U.S. Cl. .............................. 252/429 B; 526/139; 526/124
[58] Field of Search ....................... 252/429 B, 429 C

[56] References Cited

U.S. PATENT DOCUMENTS

| | | | |
|---|---|---|---|
| 3,094,568 | 6/1963 | Hay et al. | 252/429 B X |
| 3,718,635 | 2/1973 | Tomoshige et al. | 252/429 C X |
| 4,028,481 | 6/1977 | Shiomura et al. | 252/429 B X |

FOREIGN PATENT DOCUMENTS 1391322  4/1975  United Kingdom .
1392413  4/1975  United Kingdom .

*Primary Examiner*—Patrick Garvin

[57] ABSTRACT

Polymerization catalyst preparation comprising milling magnesium metal, an organic halide and titanium tetrahalide in the presence of a triaryl phosphite and an aluminum trihalide but in the absence of a complexing diluent. The titanium catalyst component is activated with an organoaluminum activator producing a catalyst for olefin polymerization. In one embodiment, the titanium catalyst component is milled in the presence of magnesium oxide. In another embodiment, the milled titanium catalyst component is subjected to heat treatment.

19 Claims, No Drawings

POLYMERIZATION CATALYSTS

This invention relates to polymerization, polymerization catalysts, and to the preparation of polymerization catalysts. In accordance with one aspect, this invention relates to the preparation of improved polymerization catalysts comprising magnesium alkyl reduced titanium tetrahalide wherein at least a portion of the milling of the basic titanium catalyst is carried out in the presence of a triaryl phosphite and an aluminum trihalide. In accordance with another aspect, solventless magnesium alkyl reduced titanium tetrahalide catalysts are prepared by milling in the presence of magnesium oxide and at least one of a triaryl phosphite and an aluminum trihalide. In accordance with a further aspect, milled titanium-containing catalysts are subjected to heat treatment following milling. In accordance with another aspect, catalysts are prepared by milling magnesium metal, an organic halide, and a titanium tetrahalide, with or without magnesium oxide present during milling, followed by subsequent milling in the presence of a triaryl phosphite and an aluminum trihalide prior to activation with an organoaluminum activator. In a further aspect, the above catalysts are useful for the polymerization of olefins, especially propylene.

It is known to reduce titanium tetrahalide with a true Grignard reagent, that is, a compound or mixture of compounds produced by reacting magnesium and an organic halide in the presence of an ether. Such a compound is conventionally expressed as RMgX. It is also known to produce what is termed in the art a "solventless" Grignard, which is produced by reacting magnesium metal with an organic halide in the presence of a solvent which is designated as a non-solvating solvent (i.e., an inert or non-complexing diluent) such as a hydrocarbon as distinguished from an ether.

True Grignard reagents as a practical matter present serious problems as reducing agents in the production of high activity catalysts in view of the difficulty in removing the large amounts of remaining ether which can reduce the effectiveness of such Grignard reagents used in preparing olefin polymerization catalyst systems.

In certain olefin polymerizations, it is necessary to tailor the catalyst to give the type of polymer desired. Particularly in the polymerization of propylene, it is desirable to cause the polymerization to take place in such a manner as to give a stereospecific polymer.

Accordingly, an object of this invention is to provide a process for the production of an improved catalyst component.

A further object of this invention is to provide a polymerization catalyst component exhibiting significant improvement in catalyst activity and/or decreased soluble polymer formation.

Another object of this invention is to provide a stereospecific catalyst system.

A further object of this invention is to provide simplified methods of producing a titanium catalyst component for olefin polymerization.

A further object of this invention is to provide for the stereospecific polymerization of propylene.

Other objects, aspects, and the several advantages of this invention will become apparent to those skilled in the art upon a study of the specification and appended claims.

In accordance with the invention, a titanium catalyst component is prepared by milling magnesium metal, an organic halide and a titanium tetrahalide in the presence of a triaryl phosphite and an aluminum trihalide.

In accordance with one embodiment of the invention, a titanium catalyst component is prepared by intensive milling of magnesium metal, an organic halide and a titanium tetrahalide under conditions to obtain a milled titanium catalyst component which is then further milled in the presence of a triaryl phosphite and an aluminum trihalide.

In accordance with a further embodiment of the invention, a titanium catalyst component is prepared by first milling titanium tetrahalide with magnesium metal, an organic halide and magnesium oxide in the absence of a complexing diluent and then additional milling in the presence of a triaryl phosphite and an aluminum trihalide.

In accordance with an additional embodiment, the milled products described above can be subjected to heat treatment to further reduce the formation of soluble polymers during polymerization.

The catalysts prepared according to this invention represent an improvement of the solventless magnesium alkyl reduced titanium tetrachloride (SMART) catalysts disclosed in Ser. No. 958,870, filed Nov. 8, 1978. A SMART catalyst can be prepared, for example, by ball milling about equal quantities (molar) of magnesium powder, n-pentyl chloride, and titanium tetrachloride for sufficient time, e.g., 3 hours, to produce a catalyst active for propylene polymerization when used with an organoaluminum compound as cocatalyst.

The improvement of the basic SMART catalyst, according to the invention, is accomplished by milling it in the presence of at least one of magnesium oxide, a triaryl phosphite, and an anhydrous trihalide of aluminum as adjuvants for the catalyst. The SMART catalyst can be milled first, with or without magnesium oxide being present, and then further milled in the presence of the other adjuvants or all of the components can be milled simultaneously. The milled catalyst component can be heat treated prior to combining with an organoaluminum activator. The resulting product is formed to exhibit a significant improvement in catalyst activity and/or decreased soluble polymer formation in propylene polymerization compared to the results obtained with the basic (unmodified) SMART catalyst.

The triaryl phosphites contemplated can be expressed as $(RO)_3P$ where R is aryl, alkyl-substituted aryl, cycloalkyl-substituted aryl and aryl-substituted aryl wherein the basic unsubstituted aryl has from 6 to 14 carbon atoms and the alkyl, cycloalkyl and aryl substituents have 1 to about 10 carbon atoms.

Exemplary triaryl phosphite compounds that can be used include triphenyl phosphite, tri-1-naphthyl phosphite, tri-9-anthryl phosphite, tri-4-phenanthryl phosphite, tri-o-tolyl phosphite, tri-p-cumenyl phosphite, tris(4-pentyl-1-naphthyl) phosphite, tris(3-heptyl-1-anthryl) phosphite, tris(5-decyl-2-phenanthryl) phosphite, tris(3-cyclobutylphenyl) phosphite, tris(6-cycloheptyl-2-naphthyl) phosphite, tris(10-cyclodecyl-9-anthryl) phosphite, tris(3-cyclopentylphenyl) phosphite, tris[4-(2-naphthyl)phenyl] phosphite, tris(7-phenyl-1-naphthyl) phosphite, tris(6-phenyl-2-anthryl) phosphite, tris(7-phenyl-1-phenanthryl) phosphite and the like. A presently preferred compound because of ready availability and relatively low cost is triphenyl phosphite.

The anhydrous aluminum trihalide can be expressed as $AlX_3$ where X is bromide, chloride, fluoride, iodide and mixtures. Presently preferred because of availability and relative low cost is aluminum trichloride.

The organic halide can be a saturated or unsaturated hydrocarbyl halide having the formula R'X in which X represents a halogen, preferably chlorine or bromine, and R' is selected from an alkynyl, alkenyl, alkyl, aryl, cycloalkenyl or cycloalkyl radical and combinations thereof such as arylalkyl, and the like containing from 1 to about 12 carbon atoms per molecule. The organic halide can also be a polyhalogenated hydrocarbyl halide of the formula R''$X_2$ where X is a halogen atom as before and R'' is a saturated divalent aliphatic hydrocarbyl radical, containing from 2 to about 10 carbon atoms per molecule. Exemplary compounds include 1,2-dibromoethane, 1,4-dichlorobutane, cyclohexyl chloride, bromobenzene, 1,10-dibromodecane and the like. An alkyl halide is presently preferred, however, containing from 1 to about 12 carbon atoms. Representative alkyl halides include methyl chloride, n-butyl bromide, n-pentyl chloride, n-dodecyl chloride and the like. A primary alkyl halide such as n-pentyl chloride is most preferred.

The magnesium is in the form of the free metal, preferably in the form of a powder.

The magnesium metal and organic halide are preferably reacted in stoichiometric amounts, although this can vary from 0.25:1 to 1:0.25 preferably from 0.75:1 to 1:1 gram atoms Mg:moles of organic halide.

The titanium tetrahalide is titanium tetrachloride, titanium tetrabromide, or titanium tetraiodide, preferably titanium tetrachloride.

The weight ratio of SMART catalyst to magnesium oxide when used can range from about 1.5 to 1 to 10 to 1. Based on the calculated amount of $TiCl_3$ present in the SMART catalyst the calculated mole ratio of $TiCl_3$:MgO can range from about 0.2:1 to 1.3:1.

The weight ratio of SMART catalyst to triaryl phosphite and to aluminum trihalide can range from about 2 to 1 to 200 to 1. Based on the calculated content of $TiCl_3$ present in the SMART catalyst, the calculated mole ratio of $TiCl_3$:triaryl phosphite can range from about 4:1 to 100:1, and the calculated mole ratio of $TiCl_3$:$AlX_3$ can range from about 1.5:1 to 40:1.

The organoaluminum compound activator component of this invention consists of trialkylaluminum compounds of formula $AlR'''_3$, dialkylaluminum compounds of formula $R'''_2AlZ$, alkyl aluminum compounds of the formula $R'''AlZ_2$ and dialkylaluminum alkoxides of formula $R'''_2AlOR'''$ wherein each $R'''$ may be the same or different and represents an alkyl group containing from 1 to about 12 carbon atoms per molecule. However, a trialkylaluminum compound is preferred, which can be admixed with one or more of the other activator compounds listed. Z represents either a hydrogen atom or a halogen atom, preferably chlorine or bromine. Preferably the $R'''AlZ_2$ compounds are dichlorides or dibromides. Examples of suitable compounds include trimethylaluminum, triethylaluminum, tri-n-dodecylaluminum, dimethylethylaluminum, demethylaluminum bromide, diethylaluminum chloride, ethylaluminum dichloride, ethylaluminum dihydride, diisobutylaluminum bromide, di-n-dodecylaluminum chloride, ethyl-t-butylaluminum chloride, diisobutylaluminum hydride, dimethylaluminum butoxide, diethylaluminum ethoxide, di-n-dodecylaluminum n-propoxide, and ethylmethylaluminum ethoxide and mixtures thereof. Triethylaluminum is preferred. It is also within the scope of this invention to use an organoaluminum monohalide (previously described) in combination with additional magnesium reducing agent (previously described) as the activator component of the polymerization catalyst system. For ethylene polymerization, the organoaluminum activator preferably consists essentially of triethylaluminum.

It is preferred to use one or more adjuvants which are polar organic compounds, i.e., electron donor compounds (Lewis bases) in addition to the magnesium reduced titanium catalyst component and activator in propylene polymerization.

These may be precontacted with the activator or titanium tetrahalide or introduced at the same time the titanium tetrahalide is introduced into contact with the magnesium reducing agent or both. Preferably the activator is precontacted with an aromatic ester adjuvant as described in detail hereinbelow.

Suitable compounds for this purpose are described in U.S. Pat. No. 3,642,746 for the disclosure of which is hereby incorporated by reference. They include amides, amines, aldehydes, arsines, alcoholates, esters, ethers, ketones, nitriles, phosphines, phosphites, phosphoramides, stibines, sulfones and sulfoxides. Examplary compounds include triethylamine, acetamide, benzaldehyde, sodium ethoxide, ethyl acetate, diethyl ether, acetone, benzonitrile, triphenyl phosphine, triphenyl phosphite (TPP), hexamethyl phosphoric triamide, triethyl stibine, trioctyl arsine, dimethyl sulfone and dibutyl sulfoxide.

Presently preferred adjuvants, when premixed with the organoaluminum compounds, are the lower alkyl esters (i.e., 1 to 4 carbon atoms per molecule) of benzoic acid which may be additionally substituted in the para position to the carboxyl group with a monovalent radical selected from the group consisting of —F, —Cl, —Br, —I, —OH, —OR'''', —COCR'''', —SH, —NH, —NR''''$_2$, —NHCOR'''', —NO$_2$, —CN, —CHO, —COOR'''', —CONH$_2$, —CONR$_2$'''', —SO$_2$R'''', and —CF$_3$. The R'''' group is a 1–4 carbon atom alkyl radical. Examples of suitable compounds include ethyl anisate (p-methoxybenzoate), ethyl benzoate, methyl benzoate, ethyl p-dimethylaminobenzoate, ethyl p-fluorobenzoate, isopropyl p-diethylaminobenzoate, butyl p-fluorobenzoate, n-propyl p-cyanobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred esters are ethyl anisate and ethyl benzoate. Triphenyl phosphite, triethylamine and dimethylaniline are preferred for mixing with the other components as they are contacted. As noted hereinabove another adjuvant such as ethyl anisate or ethyl benzoate may already be mixed with the organoaluminum compound.

If one or more adjuvants are used with the titanium tetrahalide component, the molar ratio of titanium tetrahalide compound to adjuvant (or adjuvants) is generally in the range of about 1:1 to about 200:1.

If one or more adjuvants are used with the organoaluminum compound or compounds in the activator component, the molar ratio of organoaluminum compound(s) component to adjuvant (or adjuvants) is generally in the range of about 1:1 to about 350:1. However, in no instance should the total adjuvant from all sources exceed a 1:1 mole ratio of adjuvant to aluminum.

In propylene polymerization, it is preferred to employ about equal molar amounts of each type of organoaluminum compounds, e.g., triethylaluminum and diethylaluminum chloride since good catalyst productivity is promoted. However, the mole ratios can vary from about 1:3 to 3:1. Generally, the total amount of organoaluminum compounds employed in a 1 liter reactor containing from about 0.06 to 0.2 g of catalyst calculated as $TiCl_3$ can range from about 4–12 mmoles and more preferably from about 8 to 10 mmoles. The calculated mole ratio of total organoaluminum compounds to $TiCl_3$ can range from about 25:1 to 200:1 and more preferably from about 35:1 to 165:1 since highest productivity is favored in this range. The calculated mole ratio of total organoaluminum compounds to ester, e.g., ethyl anisate, in the cocatalyst can range from about 2.4:1 to 3.2:1, preferably 2.6:1 to 3.0:1, since good productivity coupled with good stereospecificity are found in these ranges.

Generally, the mole ratio of triaryl phosphite to aluminum trihalide employed in the modified SMART catalysts is about 0.4:1. However, it can range from about 0.03:1 to about 6:1.

The SMART catalyst and the adjuvants are intensively milled together for about 0.5 to 100 hours at ambient conditions by means of a ball mill, rod mill, vibrating mill, and the like. Cooling of the mill can be employed, if desired, to keep the temperature of milling material within a specified temperature range, e.g., 25°–75° C., if desired. An atmosphere, inert in the process such as nitrogen, argon, etc., can be employed in the milling vessel.

It is within the scope of the invention to subject the milled titanium catalyst component to a suitable heat treatment to reduce the production of polymer solubles. The milled catalysts can be subjected to heat treatment at a temperature of about 50° to 250° C. under a pressure of about 0.5 psia to 5 psia (51–510 kPa) for a period of time ranging from about 10 minutes to about 5 hours.

The catalysts of this invention are suitable for the polymerization of at least one aliphatic mono-1-olefin containing 2 to 8 carbon atoms per molecule. The catalysts are particularly suitable for the stereospecific polymerization of propylene.

The conditions suitable for carrying out the polymerization reaction are similar to other related processes in which a catalyst system comprising reduced titanium is employed. The process is conveniently carried out in liquid phase in the presence or absence of an inert hydrocarbon diluent, e.g., n-heptane, n-pentane, isobutane, cyclohexane, etc., but it is not limited to liquid phase conditions. If no added diluent is used, the process can be carried out in liquid monomer which is preferred.

The polymerization temperature employed depends on the monomer employed and the mode of reaction selected but generally falls within the range of 60°–212° F. (15.5°–100° C.). In the liquid phase polymerization of propylene, for example, a temperature in the range of about 75° to about 200° F. (24°–93° C.) can be employed. Any convenient pressure is used. However, in liquid phase operation, sufficient pressure is employed to maintain the reactants in liquid phase within the reaction zone.

Gram atom ratios of Ti/Mg used in the catalyst preparation are preferably from 0.5:1 to 5:1, more preferably 0.75:1 to 1.25:1. Ratios below 0.5:1 are operable but give lower productivities. The actual ratio in the catalyst itself will be slightly lower than that used in its preparation.

As is known in the art, control of the molecular weight of the polymer is readily achieved by the presence of small amounts of hydrogen during the polymerization.

The polymers prepared with the catalysts of this invention are normally solid resinous materials which can be extruded, molded, etc., into useful articles including film, fibers, containers and the like.

EXAMPLE I

PREPARATION OF BASIC SMART CATALYST A

A 1 liter, spherical steel vessel containing 1400 g of 0.5 inch (1.3 cm) steel balls was charged, in order, with 12 g (0.5 mole) of 50 mesh (U.S. Sieve Series) magnesium powder, 61 ml (0.5 mole, 53.3 g) of n-pentyl chloride and 55 ml (0.5 mole, 94.8 g) of titanium tetrachloride. The vessel was placed on a Vibratom mill and a 3.1 hour milling time at ambient conditions was employed. The vessel was transferred to a dry box where its contents were washed with 4–800 ml portions of dry n-hexane, the milled product was washed into a fritted funnel with additional dry n-hexane and the material was washed with 3–800 ml portions of dry n-hexane. The washed material was then vacuum dried about 6 hours and sieved through a 50 mesh screen yielding 63 g of a purple colored solid as the basic SMART catalyst.

CATALYST B (CONTROL)

A 10 g sample of the base SMART Catalyst A was milled for 1.3 hours in a 250 ml steel vessel with 300 g of ¼ inch (0.64 cm) steel balls on the Vibratom. Cooling tap water (about 70° F., 21° C.) was run over the vessel during the milling. The milled sample was recovered by passage through a 100 mesh screen.

CATALYST C (INVENTION)

A 10 g sample of base SMART Catalyst A, already milled, 1.6 g $AlCl_3$ (12 mmoles) and 1.6 g TPP (5.2 mmoles) was milled 2.9 hours on the Vibratom in the manner described under Catalyst B. The deep purple product was recovered from the milling vessel through a 100 mesh screen. The weight ratio of base SMARt catalyst to each adjuvant is about 6:1. Since the base SMART catalyst is calculated to contain about 50 wt. % $TiCl_3$, a 10 g portion of it contains about 5 g (32.4 mmoles) $TiCl_3$. In Catalyst C, therefore, the calculated mole ratios are: $TiCl_3:AlCl_3$ of 2.7:1, $TiCl_3$:TPP of 6.2:1 and TPP:$AlCl_3$ of 0.4:1.

CATALYST A[1]

This is a repeat preparation of base SMART Catalyst A employing the same quantities of reagents and same procedure recited before. The milling time used was 3.8 hours. The recovered product weighed 68 g.

CATALYST D (CONTROL)

A 10 g sample of Catalyst base A[1] was milled for 1.2 hours on the Vibratom in a 250 ml steel vessel containing 300 g of ¼ inch steel balls employing cooling as described for Catalyst B. The milled sample was recovered by passage through a 50 mesh screen.

CATALYST E (INVENTION)

A 10 g sample of Catalyst A[1], 1.1 g $AlCl_3$ (8.2 mmoles) and 1.1 g TPP (3.5 mmoles) was milled 2.8 hours in the manner described for Catalyst C. The product was recovered through a 50 mesh screen. The weight ratio of base SMART catalyst to each adjuvant is about 9:1. The calculated mole ratios are: TiCl$_3$:AlCl$_3$ of 4.0:1, TiCl$_3$:TPP of 9.3:1 and TPP:AlCl$_3$ of 0.4:1.

CATALYST F (INVENTION)

A 10 g sample of catalyst base A$^1$, 1.6 g AlCl$_3$ and 1.6 g TPP was milled for 2.8 hours in the manner described under Catalyst A. The product was recovered through a 50 mesh screen. The weight and calculated mole ratios for this catalyst are the same reported for Catalyst B.

CATALYST G (INVENTION)

A 6.7 g sample of Catalyst base A$^1$, 1.65 g AlCl$_3$ (12.4 mmoles) and 1.65 g TPP (5.32 mmoles) was charged to a 250 ml steel vessel containing 350 g of ¼ inch steel balls and milled for 2.5 hours. The red-brown product was recovered through a 50 mesh screen. The weight ratio of base SMART catalyst to each adjuvant is about 4:1. In 6.7 g of catalyst base A$^1$ is calculated TiCl$_3$ content of about 3.35 g (21.7 mmoles). The calculated mole ratios are: TiCl$_3$:AlCl$_3$ of 1.7:1, TiCl$_3$:TPP of 4.1:1 and TPP:AlCl$_3$ of 0.4:1.

CATALYST H (INVENTION)

A 3.0 g sample of catalyst base A$^1$, 0.75 g AlCl$_3$ (5.6 mmoles) and 0.75 g TPP (2.4 mmoles) was milled for 2.3 hours on the Vibratom in the manner described under Catalyst F. The red-brown product was recovered through a 50 mesh screen. The weight and molar ratios of the components are the same reported for Catalyst F.

CATALYST A$^2$

This is another repeat preparation of base SMART Catalyst A employing the same quantities of reagents and same procedure recited before. The milling time used was 3.5 hours. The recovered product weight 67 g.

CATALYST I (CONTROL)

A 10 g sample of catalyst base A$^2$ was milled for 2 hours in a 250 ml steel vessel containing 350 g of ¼ inch steel balls on the Vibratom. The milled sample was recovered by passage through a 50 mesh screen.

CATALYST J (INVENTION)

A 4.2 g sample of Catalyst base A$^2$, 0.65 g AlCl$_3$ (4.8 mmoles), and 0.65 g TPP (2.1 mmoles) was milled for 1¾ hours in a 250 ml steel vessel containing 350 g of ¼ inch steel balls on the Vibratom with no cooling employed. The product was recovered through a 50 mesh screen. The weight ratio of base SMART Catalyst A$^2$ to each adjuvant is about 6.5:1. The calculated mole ratios are TiCl$_3$:AlCl$_3$ of 2.8:1, TiCl$_3$:TPP of 6.5:1 and TPP:AlCl$_3$ of 0.4:1.

CATALYST A$^3$

Three separate batches were prepared, each employing twice the quantities of reagents used in preparing the base SMART Catalyst A. Each batch was ball milled at ambient conditions in a 2 liter Norton grinding jar containing 5000 g of 0.5 inch steel balls by means of a roll mill. Batch 1 was milled for 75¼ hours, batch 2 for 72½ hours and batch 3 for 70¼ hours. Each product was recovered as described in part (A), combined and blended together to yield 484 g of total product.

CATALYST K (CONTROL)

A 10 g sample of Catalyst base A$^3$ and 0.4 g AlCL$_3$ (3.0 mmoles) was charged to a Norton size 000 jar mill containing 500 g of ¼ inch steel balls and the mixture was milled for 16 hours at ambient conditions on a roll mill. The product was recovered through a 50 mesh screen. In 10 g of catalyst base A$^3$ is a calculated TiCl$_3$ content of about 5 g (32.4 mmoles). Therefore, the calculated mole ratio of TiCl$_3$:AlCl$_3$ is 10.8:1. The weight ratio of the base SMART catalyst to AlCl$_3$ is about 25:1.

EXAMPLE II

Propylene was polymerized in a 1 l stirred, reactor employing the designated catalyst and the process described in the basic SMART catalyst. Each run was conducted at about 175° F. (80° C.) for 1 hour in the presence of molecular hydrogen as a polymer molecular weight modifier. Initial partial pressure of hydrogen was about 24.7 psia (0.17 MPa). The polymers were isolated and the yields of crystalline power and xylene-soluble polymer determined as in the cited case. The calculated productivity is expressed as g polymer per g catalyst per hour. The abbreviations have the following meanings:

TPP—triphenyl phosphite
DEAC—diethylaluminum chloride
TEA—triethylaluminum
EA—ethyl anisate The quantities of compounds employed and the results obtained are presented in Table 1.

TABLE I

| | PROPYLENE POLYMERIZATION | | | | | |
|---|---|---|---|---|---|---|
| RUN NO. | 1 | 2 (Inv.) | 3 | 4 | 5 | 6 |
| Catalyst | | | | | | |
| Parts by weight per 100 parts unmodified base. | | | | | | |
| Number | B | C | C | C | A$^3$ | K |
| TPP | 0 | 12 | 12 | 12 | 0 | 0 |
| AlCl$_3$ | 0 | 12 | 12 | 12 | 0 | 25 |
| Charged mg | 51.0 | 55.5 | 43.4 | 40.1 | 47.9 | 67.4 |
| Calc. TiCl$_3$ | | | | | | |
| mg | 25.5 | 21.0 | 16.4 | 15.2 | 24.0 | 32.4 |
| mmoles | 0.17 | 0.14 | 0.11 | 0.10 | 0.16 | 0.21 |
| Cocatalyst | | | | | | |
| Calc. mmoles | | | | | | |
| DEAC | 4.95 | 4.95 | 0 | 4.12 | 0 | 0 |
| TEA | 4.95 | 4.95 | 9.80 | 0 | 9.80 | 9.80 |
| EA | 3.25 | 3.25 | 3.25 | 0 | 3.25 | 3.25 |
| Total Al/TiCl$_3$[d] | 58 | 71 | 89 | 41 | 61 | 47 |
| EA/TiCl$_3$[d] | 19 | 23 | 30 | 0 | 20 | 15 |
| Total Al Cpds/EA[c] | 3 | 3 | 3 | na[b] | 3 | 3 |
| Polymer Yield, g | 94.5 | 138.4 | 68.3 | 25.0 | 66.6 | 135.7 |
| Wt. % Xylene Soluble Polymer | 13 | 5.7 | 8.5 | nd[a] | 12 | 11 |
| Calc. Productivity g/g/hr. | 1850 | 2490 | 1570 | 623 | 1390 | 2010 |

Note:
[a]nd is not determined
[b]na is not applicable
[c]Al compounds in the cocatlyst system (calculated mole ratio)
[d]Calculated mole ratio
[e]Runs 1 and 3–6 are controls In inspecting the data given in Table 1 it is noted that the base SMART catalysts employed in control runs 1 and 5 are of different preparations hence runs 1–4 are to be compared directly and runs 5–6 are to be compared directly. The productivity and soluble polymer results shown in run 1 are typical of an unmodified (base) SMART catalyst. Invention run 2 shows that milling 12 parts by weight each of AlCl$_3$ and TPP with the base catalyst yields a composite, a sample of which gives about 600 g polymer per g catalyst per hour more than the base catalyst and the soluble polymer formed has decreased from 13 wt. % to 5.7 wt. %. Control run 3 shows at about the same level of total organoaluminum compound in the cocatalyst as in run 2 that the absence of DEAC in the cocatalyst system results in significantly lower productivity. Control run 4 shows that DEAC alone is not an effective cocatalyst with the catalysts of this invention. (Although only about ½ the amount of organoaluminum compound is employed as in runs 2 and 3 it is believed based on previous work that doubling the DEAC level would have little effect on the productivity results).

In comparing the results of control runs 5 and 6, it can be seen that incorporating $AlCl_3$ in the base catalyst yields a composite, a sample of which is more active in propylene polymerization than the unmodified catalyst. However, the level of soluble polymer produced is essentially the same as that produced with the base catalyst, hence, improvement in decreasing soluble polymer is not realized.

EXAMPLE III

Propylene was polymerized as described previously by contact with the designated catalyst. The effect of varying the amounts of TPP and $AlCl_3$ employed in preparing the catalysts was determined. Unless otherwise indicated, each run was 1 hour in length conducted at 80° C. in the presence of molecular hydrogen as before. The polymers were isolated and the results determined as described before. The abbreviations have the same meaning as in the previous example.

The quantities of compounds employed and the results obtained are given in Table 2.

Inspection of the results presented in Table 2 shows that invention runs 8–10 in which the incorporation of from 9 to 16.5 parts by weight each of $AlCl_3$ and TPP with 100 parts by weight base SMART catalyst has been made yields active catalysts which exhibit increased polymer yields and/or decreased soluble polymer formation than the results shown in control run 1. Invention run 11 demonstrates that the invention catalysts retain polymerization activity for at least 2½ hours. The productivity and soluble polymer results shown in invention run 12 show that good polymer productivity is achieved even when the total organoaluminum compound level is cut about 50% from about 10 to about 5 mmoles. However, even though a favorable mole ratio of organoaluminum compounds to EA of 3 is used, the amount of soluble polymer formed has increased to about 10 wt. % from the 7–8 wt. % level because the amount of EA employed is reduced from a desirable level of about 3.2 mmoles to about 1.6 mmoles.

EXAMPLE IV

Propylene was polymerized as described before by contact with the designated catalysts. The effect of various reactor temperatures employed during polymerization was determined as was the effect of varying the cocatalyst system. Each run was conducted for 1 hour at 80° C. in the presence of molecular hydrogen. The polymers were isolated and the results determined in the manner described before. The abbreviations have the same meaning as before.

The quantities of compounds employed and the results obtained are presented in Table 3.

TABLE 2

| | PROPYLENE POLYMERIZATION | | | | | |
|---|---|---|---|---|---|---|
| RUN NO. | 7 | 8 (Inv.) | 9 (Inv.) | 10 (Inv.) | 11 (Inv.) | 12 (Inv.) |
| Catalyst | | | | | | |
| Parts by weight per 100 parts unmodified base | | | | | | |
| Number | D | E | F | G | H | H |
| TPP | 0 | 9 | 12 | 16.5 | 16.5 | 16.5 |
| $AlCl_3$ | 0 | 9 | 12 | 16.5 | 16.5 | 16.5 |
| Charged mg | 34.9 | 41.5 | 45.7 | 47.5 | 28.6 | 41.4 |
| Calc. $TiCl_3$ | | | | | | |
| mg | 17.4 | 17.0 | 17.3 | 15.9 | 4.58 | 13.9 |
| mmoles | 0.11 | 0.11 | 0.11 | 0.10 | 0.062 | 0.090 |
| Cocatalyst | | | | | | |
| Calc. mmoles | | | | | | |
| DEAC | 4.95 | 4.95 | 4.95 | 4.95 | 4.95 | 2.48 |
| TEA | 4.95 | 4.95 | 4.95 | 4.95 | 4.95 | 2.48 |
| EA | 3.25 | 3.25 | 3.25 | 3.25 | 3.25 | 1.63 |
| Total Al/$TiCl_3$[d] | 89 | 89 | 89 | 98 | 158 | 55 |
| EA/$TiCl_3$[c] | 30 | 30 | 30 | 32 | 52 | 18 |
| Total Al Cpds/EA[a] | 3 | 3 | 3 | 3 | 3 | 3 |
| Polymer Yield, g | 73.8 | 110.6 | 83.9 | 107.4 | 91.2 | 95.6 |
| Wt. % Xylene Soluble Polymer | 10.6 | 8.0 | 6.7 | 7.2 | 7.6 | 9.7 |
| Calc. Productivity g/g/hr. | 2110 | 2670 | 1840 | 2260 | 3190[b] | 2310 |

Notes:
[a]Al compounds in the cocatalyst system (calculated mole ratio)
[b]Polymer produced in a 2½ hr. run
[c]Calculated mole ratio
[d]Run 7 is control

TABLE 3

| | PROPYLENE POLYMERIZATION | | | | | |
|---|---|---|---|---|---|---|
| RUN NO. | 13 | 14 (Inv.) | 15 (Inv.) | 16 | 17 (Inv.) | 18 |
| Reactor Temp. °C. | 80 | 80 | 80 | 80 | 71 | 60 |
| Catalyst | | | | | | |

TABLE 3-continued

| | PROPYLENE POLYMERIZATION | | | | | |
|---|---|---|---|---|---|---|
| RUN NO. | 13 | 14 (Inv.) | 15 (Inv.) | 16 | 17 (Inv.) | 18 |
| Parts by weight per 100 parts unmodified base | | | | | | |
| Number | I | J | J | J | J | J |
| TPP | 0 | 12 | 12 | 12 | 12 | 12 |
| AlCl$_3$ | 0 | 12 | 12 | 12 | 12 | 12 |
| Charged mg | 49.2 | 41.2 | 37.6 | 37.6 | 36.5 | 39.4 |
| Calc. TiCl$_3$ | | | | | | |
| mg | 24.6 | 15.6 | 14.3 | 14.3 | 13.8 | 14.9 |
| mmoles | 0.16 | 0.10 | 0.092 | 0.092 | 0.090 | 0.097 |
| Cocatalyst | | | | | | |
| Calc. mmoles | | | | | | |
| DEAC | 4.95 | 4.95 | 2.48 | 2.48 | 2.48 | 2.48 |
| TEA | 4.95 | 4.95 | 2.48 | 2.48 | 2.48 | 2.48 |
| EA | 3.25 | 3.25 | 1.63 | 3.25 | 1.63 | 1.63 |
| Total Al/TiCl$_3$(b) | 61 | 98 | 54 | 54 | 55 | 51 |
| EA/TiCl$_3$(b) | 20 | 32 | 18 | 35 | 18 | 17 |
| Total Al cpds/EA(a) | 3 | 3 | 3 | 1.5 | 3 | 3 |
| Polymer Yield g | 87.0 | 87.2 | 116.0 | 21.8 | 110.0 | 92.9 |
| Wt. % Xylene Soluble Polymer | 10.1 | 7.3 | 11.0 | 7.8 | 7.7 | 14.2 |
| Calc. Productivity g/g/hr. | 1770 | 2120 | 3080 | 580 | 3020 | 2360 |

Notes:
(a)Al compounds in the cocatalyst system (calculated mole ratio)
(b)Calculated mole ratio
(c)Runs 13, 16 and 18 are controls Inspection of the Table 3 data shows in control run 13 the typical results obtained with the unmodified base catalyst, e.g., soluble polymer about 10. wt. % and a productivity of about 1800 g polymer per g catalyst per hour at about 80° C. In the remaining runs each catalyst contained 12 parts by weight each of AlCl$_3$ and TPP per 100 parts by weight unmodified SMART catalyst. Invention runs 14, 15 and 17 demonstrate the increased productivity resulting even at several cocatalyst variations at reactor temperatures of 80° C. and 71° C. The results shown in runs 15 and 17 suggest that when the cocatalyst level is cut about 50% from that of run 14 it is desirable to also lower the reactor temperature from about 80° C. to about 70° C. Thus soluble polymer formation is reduced from about 11 wt. % at 80° C. to about 8 wt. % at 70° C. without affecting productivity. The results of control run 16 shows that when the total organoaluminum compound to EA ratio is decreased below the instant invention specified minimum of about 2.6:1, low soluble polymer formation is achieved but at the expense of lower productivity to an unacceptable low level of about 600 g polymer per g catalyst per hour. Control run 18 shows that a reactor temperature of about 60° C. is too low in the instant process with the catalysts employed. Although good productivity results are shown, the soluble polymer formed has increased to an unacceptable level of about 14 wt. %.

EXAMPLE V

CATALYST A$^4$ (CONTROL)

This is a repeat preparation of base SMART Catalyst A employing the same quantities of reagents and the same procedure recited before for Catalysts A, A$^1$ and A$^2$. The recovered purple-maroon colored product weighed 75 g.

CATALYST L (CONTROL)

In this example, the basic SMART Catalyst A was prepared in the presence of powdered MgO which had been previously heated for 16 hours at about 1000° F. (538° C.) in air, then cooled. A 1 liter spherical steel vessel containing 1400 g of 0.5 inch steel balls was charged with the same quantity of reagents as described in Example I plus 36 g (0.89 mole) of MgO. The weight ratio of base SMART catalyst to MgO is about 4.4 to 1. The vessel was placed on the Vibraton and a 3.75 hour milling time was employed. The purple colored recovered product weighed 110 g.

CATALYST M (INVENTION)

A 5 g sample of control Catalyst L, 0.8 g AlCl$_3$ (6 mmoles) and 0.77 g TPP (2.5 mmoles) was milled for 2 hours in a 250 ml steel vessel with 300 g of ¼ inch steel balls on the Vibraton at ambient conditions. After milling, the vessel and contents were heated for 1 hour at 95° C. The brownish-violet solid product was recovered from the vessel through a 50 mesh screen following the heat treatment. The calculated amount of MgO in 5 g of Catalyst L is 1.75 g (43 mmoles) and 3.25 g of base SMART catalyst. Thus, the calculated amount of TiCl$_3$ in 5 g of Catalyst L is 1.625 g (11 mmoles). The calculated weight ratio of base SMART catalyst to each adjuvant is about: SMART:MgO of 1.8:1, SMART:AlCl$_3$ of 4.1:1, and SMART:TPP of 4.2:1. The calculated mole ratios are TiCl$_3$:MgO of 0.26:1, TiCl$_3$:AlCl$_3$ of 1.8:1, TiCl$_3$:TPP of 4.4:1 and TPP:AlCl$_3$ of 0.42:1.

Propylene was polymerized as described previously by contact with the catalysts at 70°–71° C. The quantities of compounds employed and the results obtained are given in Table 4. The abbreviations have the same meanings as before.

TABLE 4

| | PROPYLENE POLYMERIZATION | | | |
|---|---|---|---|---|
| Run No. | 19 (Control) | 20 (Control) | 21 (Inv.) | 22 (Inv.) |
| Catalyst | | | | |
| Parts by weight per 100 parts unmodified base | | | | |
| Number | A$^4$ | L | M | M |
| TPP | 0 | 0 | 4.2 | 4.2 |
| AlCl$_3$ | 0 | 0 | 4.1 | 4.1 |
| MgO | 0 | 4.4 | 1.8 | 1.8 |
| Charged mg | 44.1 | 42.0 | 38.9 | 29.4 |

TABLE 4-continued
PROPYLENE POLYMERIZATION

| Run No. | 19 (Control) | 20 (Control) | 21 (Inv.) | 22 (Inv.) |
|---|---|---|---|---|
| Calculated TiCl$_3$ | | | | |
| mg | 22.05 | 13.6 | 9.6 | 7.3 |
| mmoles | 0.14 | 0.088 | 0.062 | 0.047 |
| Cocatalyst | | | | |
| Calc. mmoles | | | | |
| DEAC | 2.15 | 2.15 | 2.15 | 2.15 |
| TEA | 2.15 | 2.15 | 2.15 | 2.15 |
| EA | 1.63 | 1.63 | 1.63 | 1.63 |
| Total Al$^{(a)}$/TiCl$_3$ | 31 | 49 | 69 | 91 |
| EA/TiCl$_3$ | 12 | 19 | 26 | 35 |
| Total Al Cpds./EA | 2.6 | 2.6 | 2.6 | 2.6 |
| Polymer Yield, g | 80.2 | 39.6 | 91.3 | 95.5 |
| Wt. % Xylene Soluble Polymer | 11.6 | 13.5 | 9.1 | 9.1 |
| Cal. Productivity, g/g/hr | 1820 (3640)$^{(b)}$ | 943 (2910)$^{(b)}$ | 2350 (9510)$^{(b)}$ | 3250/ 2.5 hrs 13080/ 2.5 hrs.)$^{(b)}$ |

$^{(a)}$Total moles of Al compounds in cocatalyst
$^{(b)}$Calculated grams polymer per gram calculated TiCl$_3$ Control catalyst A$^4$ used in Run 19 is the unmodified SMART catalyst for the other catalysts prepared in this time period. The results obtained with it are similar to those obtained previously in other time periods. The addition of only MgO to the SMART catalyst results in a low productive catalyst as the results of Run 20 demonstrate. Thus, productivity is about halved and somewhat more soluble polymer is formed. However, the combination of MgO, TPP, and AlCl$_3$ as promoters (adjuvants) for the base SMART catalyst simultaneously improves catalyst productivity and lowers soluble polymer formation. A marked jump in productivity is more clearly seen when the catalysts are compared on the basis of grams polymer produced per gram calculated TiCl$_3$ per hour. Part of the increase is attributed to the heat treatment afforded invention catalyst M.

We claim:

1. A process comprising contacting
   (a) magnesium metal,
   (b) an organic halide of the formula R'X or R''X$_2$ where X represents a halogen, R' is selected from alkynyl, alkenyl, alkyl, aryl, cycloalkenyl or cycloalkyl radicals and combinations thereof containing from 1 to 12 carbon atoms per molecule and R'' is a saturated divalent aliphatic hydrocarbyl radical and
   (c) a titanium tetrahalide and subjecting same to intensive milling in the presence of
   (d) a triaryl phosphite
   (e) an anhydrous aluminum trihalide and
   (f) magnesium oxide but in the absence of a complexing or extraneous diluent;
   thereafter activating the thus produced titanium catalyst component by contacting same with
   (g) an activator comprising a trialkylaluminum compound, a dialkylaluminum chloride, and a polar organic adjuvant which is an electron donor, said adjuvant further being characterized as a 1 to 4 carbon atom alkyl ester of a substituted or unsubstituted benzoic acid.

2. A process according to claim 1 wherein (d) is a compound of the formula (RO)$_3$P where R is aryl, alkyl-substituted aryl, cycloalkyl-substituted aryl and aryl-substituted aryl wherein the basic unsubstituted aryl has from 6 to 14 carbon atoms and the alkyl, cycloalkyl and aryl substituents have 1 to about 10 carbon atoms and (e) is a compound of the formula AlX$_3$ where X is bromide, chloride, fluoride, iodide and mixtures thereof.

3. A process according to claim 1 wherein (c) is titanium tetrachloride, (b) is a compound of the formula R'X in which X represents chlorine or bromine and R' is selected from alkynl, alkenyl, alkyl, aryl, cycloalkenyl, or cycloalkyl radicals having 1 to 12 carbon atoms, and wherein said milling is carried out at a temperature within the range of 40°-110° C.

4. A method according to claim 1 wherein (a), (b) and (c) are first subjected to intensive milling and subsequently subjected to intensive milling with (d), (e) and (f).

5. A process according to claim 1 wherein the weight ratio of the total of (a), (b) and (c) to the total of (d) and (e) ranges from about 2 to 1 to about 200 to 1, the mole ratio of (d) to (e) is within the range of about 0.03 to 1 to about 6 to 1, and said magnesium metal and organic halide are introduced in about stoichiometric amounts.

6. A process according to claim 1 wherein said milling is done by ball milling and wherein said organoaluminum activator consists essentially of triethylaluminum, diethylaluminum chloride, and ethyl anisate and the atom ratio of magnesium to titanium is within the range of 0.75:1 to 1.25:1.

7. A process according to claim 1 wherein (d) is triphenyl phosphate and (e) is aluminum chloride.

8. A process according to claim 7 wherein said milling is done for a time of 1 to 50 hours, said organic halide is n-pentyl chloride, said titanium tetrahalide is titanium tetrachloride, said organoaluminum activator is triethylaluminum plus ethyl anisate and diethylaluminum chloride and wherein the atom ratio of magnesium to titanium is within the range of 0.75:1 to 1.25:1.

9. A catalyst according to claim 8.
10. A catalyst according to claim 1.
11. A catalyst according to claim 6.
12. A process comprising:
    (a) combining an organic halide of the formula R'X or R''X$_2$ where X represents a halogen, R' is selected from alkynyl, alkenyl, alkyl, aryl, cycloalkenyl or cycloalkyl radical and combinations thereof containing from 1 to 12 carbon atoms per molecule and R'' is a saturated divalent aliphatic hydrocarbyl radical, with a titanium tetrahalide and magnesium metal and subjecting same to intensive milling in the absence of any extraneous diluent to produce a titanium catalyst component;
    (b) milling the entire reaction product of (a) with a triaryl phosphite and an anhydrous aluminum trihalide, and
    (c) thereafter contacting the milled product of (b) with an activator comprising a trialkylaluminum compound, a dialkylaluminum chloride, and a polar organic adjuvant which is an electron donor, said adjuvant further being characterized as a 1 to 4 carbon atom alkyl ester of a substituted or unsubstituted benzoic acid.

13. A method according to claim 12 wherein said adjuvant is ethyl anisate.

14. A process according to claim 12 wherein the milled product obtained in step (b) is subjected to thermal treatment at a temperature in the range of about 50° C. to 250° C. prior to contacting with an organoaluminum activator in step (c).

15. A process according to claim 12 wherein magnesium oxide is combined with said organic halide, said titanium tetrahalide, and said magnesium metal in step (a) prior to said intensive milling.

16. A process according to claim 12 wherein said triaryl phosphite is triphenyl phosphite, said aluminum trihalide is aluminum trichloride, said titanium tetrahalide is titanium tetrachloride, said organic halide is n-pentyl chloride, and said organoaluminum activator is triethylaluminum plus ethyl anisate and diethylaluminum chloride.

17. A catalyst produced by the method of claim 16.

18. A catalyst produced by the method of claim 17.

19. A catalyst produced by the method of claim 14.

* * * * *